(12) United States Patent
Klassen et al.

(10) Patent No.: US 8,019,058 B2
(45) Date of Patent: Sep. 13, 2011

(54) SYSTEM AND METHOD FOR FAST, RELIABLE SETUP OF VOICEMAIL PLAYBACK

(75) Inventors: Gerhard D. Klassen, Waterloo (CA); Raymond Vander Veen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1163 days.

(21) Appl. No.: 11/463,029

(22) Filed: Aug. 8, 2006

(65) Prior Publication Data

US 2008/0037734 A1    Feb. 14, 2008

(51) Int. Cl.
*H04M 1/64* (2006.01)
*H04W 4/00* (2009.01)
(52) U.S. Cl. ............................ 379/88.23; 455/466
(58) Field of Classification Search ............ 455/412.1, 455/413, 466; 379/88.17–88.23
See application file for complete search history.

(56) References Cited

U.S. PATENT DOCUMENTS

| | | | |
|---|---|---|---|
| 6,389,276 B1 * | 5/2002 | Brilla et al. | 455/413 |
| 6,658,485 B1 * | 12/2003 | Baber et al. | 719/314 |
| 6,970,711 B2 | 11/2005 | Mizell et al. | |
| 7,043,264 B2 | 5/2006 | Vance et al. | |
| 7,224,775 B1 * | 5/2007 | Shaffer et al. | 379/88.16 |
| 7,395,085 B1 * | 7/2008 | Mauer et al. | 455/552.1 |
| 7,590,410 B2 * | 9/2009 | Becker et al. | 455/412.1 |
| 2003/0228863 A1 * | 12/2003 | Vander Veen et al. | 455/412.1 |
| 2004/0022237 A1 * | 2/2004 | Elliott et al. | 370/356 |
| 2004/0073566 A1 * | 4/2004 | Trivedi | 707/102 |
| 2006/0167849 A1 | 7/2006 | Marcus et al. | |
| 2007/0038703 A1 * | 2/2007 | Tendjoukian et al. | 709/206 |
| 2008/0159257 A1 * | 7/2008 | Alfano et al. | 370/349 |

FOREIGN PATENT DOCUMENTS

| | | |
|---|---|---|
| EP | 1379061 A2 | 1/2004 |
| GB | 2382272 A | 5/2003 |

OTHER PUBLICATIONS

European Patent Office, Extended European Search Report regarding application No. 06118616.9, dated Jan. 23, 2007.
Canadian Intellectual Property Office, Examiner's Report regarding application No. 2,596,182 dated Sep. 25, 2009.

* cited by examiner

*Primary Examiner* — Davetta W Goins
*Assistant Examiner* — Mohammad Islam
(74) *Attorney, Agent, or Firm* — Ridout & Maybee LLP (57) ABSTRACT

A system and method that enables faster, more reliable setup of voicemail message playback for a mobile device is provided. A mobile device receives an message that alerts the user that a voicemail message has been received. When a user dials into the voicemail system to retrieve the message, a message is sent from the mobile device to the voicemail system to tell the voicemail system to queue-up the message for playback. The message proceeds from the mobile device through a relay to a virtual Message Service Center (MSC) gateway over a high-speed GPRS connection. The virtual MSC gateway sends the message to the voicemail system over a permanent or substantially permanent connection. Communications are acknowledged to increase reliability. The voicemail system is ready to play the message when the voice call is received.

30 Claims, 5 Drawing Sheets

SYSTEM AND METHOD FOR FAST, RELIABLE SETUP OF VOICEMAIL PLAYBACK

TECHNICAL FIELD

The exemplary embodiments herein relate to systems and methods for the playback of voicemail messages, and, more particularly, to a system and method that enables faster, more reliable setup of voicemail message playback for a mobile device that connects to a virtual Message Service Center (VMSC) gateway that may be permanently connected to a voicemail system.

BACKGROUND

It is well known that voicemail systems increase the convenience of using telephones by recording messages when a user cannot take a call, in such instances where the user is, for example, unavailable and misses the call, already on the phone, otherwise unavailable, etc. For mobile devices, voicemail is also advantageous when the mobile device is turned-off or out of its coverage area. With the increasing popularity of mobile devices, particularly those with, for example, call waiting features, voicemail systems have become popular among a wide cross-section of consumers.

A popular feature for voicemail users, especially those with mobile phones, is notification of a received message. Typically, an automatically generated notification message will be sent from a wireless carrier to a user's mobile device to alert the user that a voicemail message has been received and is waiting for pickup. The notification message often is sent via Short Message Service (SMS). A typical notification message might include information about the call, such as, for example, the name and/or number of the caller, the time the call was received, the length of the message, etc. A notification message may also include a unique identifier that tells the wireless carrier's voicemail system which message to play. Users generally dial in to voicemail systems through wireless networks to retrieve and listen to their messages.

However, the process of dialing into a voicemail system through a wireless network and waiting for the voicemail system to retrieve the relevant message from a voice mailbox is often slow. Thus, to reduce this delay, further improvements have been made to voicemail systems, including preparation of voicemail messages for playback when the voicemail system anticipates that a user is about to dial in to listen to a stored message. Specifically, when the notification that a voicemail message has been received is sent to the mobile device, for example, the mobile device can, in turn, notify the voicemail system that the user is about to dial in to the system to play the message identified by a unique identifier attached to the notification message. Sending the message in advance over a separate data connection allows the voicemail system to queue up the message for playback so that the message can be played as soon as the mobile device establishes a voice connection to the voicemail system.

However, this approach may have several drawbacks. For example, a fast, reliable connection may not be available at a given time because, for example, there may not be data coverage in a given location, thus preventing the delivery of notification messages to the mobile device, and/or notification messages to the voicemail system. Because typical notification messages are sent using Short Message Service (SMS), even if an SMS message is successfully sent, SMS messages usually travel slowly under normal conditions. Furthermore, SMS is inherently unreliable because SMS messages may not be acknowledged and delivery is not guaranteed. Thus, further problems are likely, as it is possible that, for example, the wrong message may be played, the voicemail system may not be ready (also causing delays), the voicemail system may be non-responsive, or the like.

Therefore, there is a need to overcome these and other disadvantages caused by the inherent unreliability of SMS messaging alone to provide advance notification to voicemail systems. A user could then receive notice of a received voicemail message and then enjoy fast, reliable playback of that message.

BRIEF DESCRIPTION OF THE DRAWINGS

These and other features and advantages will be better and more completely understood by reference to the following detailed description of exemplary illustrative embodiments in conjunction with the drawings, of which.

DETAILED DESCRIPTION

Accordingly, a feature of certain exemplary illustrative embodiments establishes and maintains a transport method, which includes data connections between a virtual Message Service Center (MSC) and the voicemail system, and between the virtual MSC and the mobile device. A conventional Short Message Service Center (SMSC) may, for example, control encoding and decoding, sending and receiving, and the like for certain messages. A virtual MSC may, for example, provide additional functionality in addition to, or in place of, a conventional SMSC, such as, for example, providing increased interoperability of systems, authentication and more rapid transport of messages, and the like, for example, by virtue of maintaining a data connection between a user device and the virtual MSC. An exemplary transport method may allow for fast and reliable transmissions from the voicemail system to the mobile device, and from the mobile device to the voicemail system because, for example, with the use of the virtual MSC, no new connections need to be established, the data connection exists apart from the voice connection, and the data connection preferably is a permanent connection. Another feature of certain exemplary illustrative embodiments creates a reliable transport method for delivering messages. Reliability may be increased because various components involved in the communications chain may acknowledge successful message transmission from the component that sent the message before attempting to pass on the message to the next component.

Thus, in accordance with an exemplary illustrative embodiment, a system and method of notification and retrieval of a voicemail message received by a voicemail system is provided. This illustrative embodiment includes, for example, sending a message from the voicemail system across a permanent network connection to a virtual Message Service Center (VMSC) gateway, and relaying the message through, for example, a relay to a mobile device. The mobile device receives the message, which may include, for example, voicemail message information, such as, for example, a unique identifier of said voicemail message.

In accordance with another exemplary illustrative embodiment, a system and method of advanced notification to a voicemail system that a user is about to request voicemail message playback is provided. This illustrative embodiment may preferably include, for example, sending a message from a mobile device to a voicemail system through a VMSC gateway. The voicemail system receives the message from the VMSC gateway, and the voicemail system, in response to the received message, queues-up the voicemail message for playback. The message may comprise voicemail message information, such as, for example, a unique identifier of the voicemail message.

According to still another exemplary illustrative embodiment, a system and method of advanced notification to a voicemail system that a user is about to request voicemail message playback, is provided. This illustrative embodiment preferably includes, for example, sending a first message from the voicemail system across a preferably permanent network connection to a VMSC gateway, and relaying the first message to a mobile device. The mobile device receives the first message, which may include, for example, voicemail message information, such as, for example, a unique identifier of said voicemail message. Then, a second message is sent from the mobile device to the VMSC gateway after the user calls the voicemail system. The voicemail system receives the second message from the VMSC gateway, and the voicemail system queues-up the voicemail message for playback. The voicemail system receives the user-initiated phone call and plays back the user-requested voicemail message. The second message may comprise voicemail message information, such as, for example, a unique identifier of the voicemail message. Optionally, a relay may be interposed between the device and the VMSC, for facilitating communication therebetween.

Non-limiting exemplary embodiments also may acknowledge successful communication between the voicemail system and the VMSC gateway, between the VMSC gateway and the relay, and between the relay and the mobile device. Preferably, the messages in the above exemplary illustrative embodiments are sent across a substantially permanent GPRS data connection that is independent of any voice connection.

Figure 1:
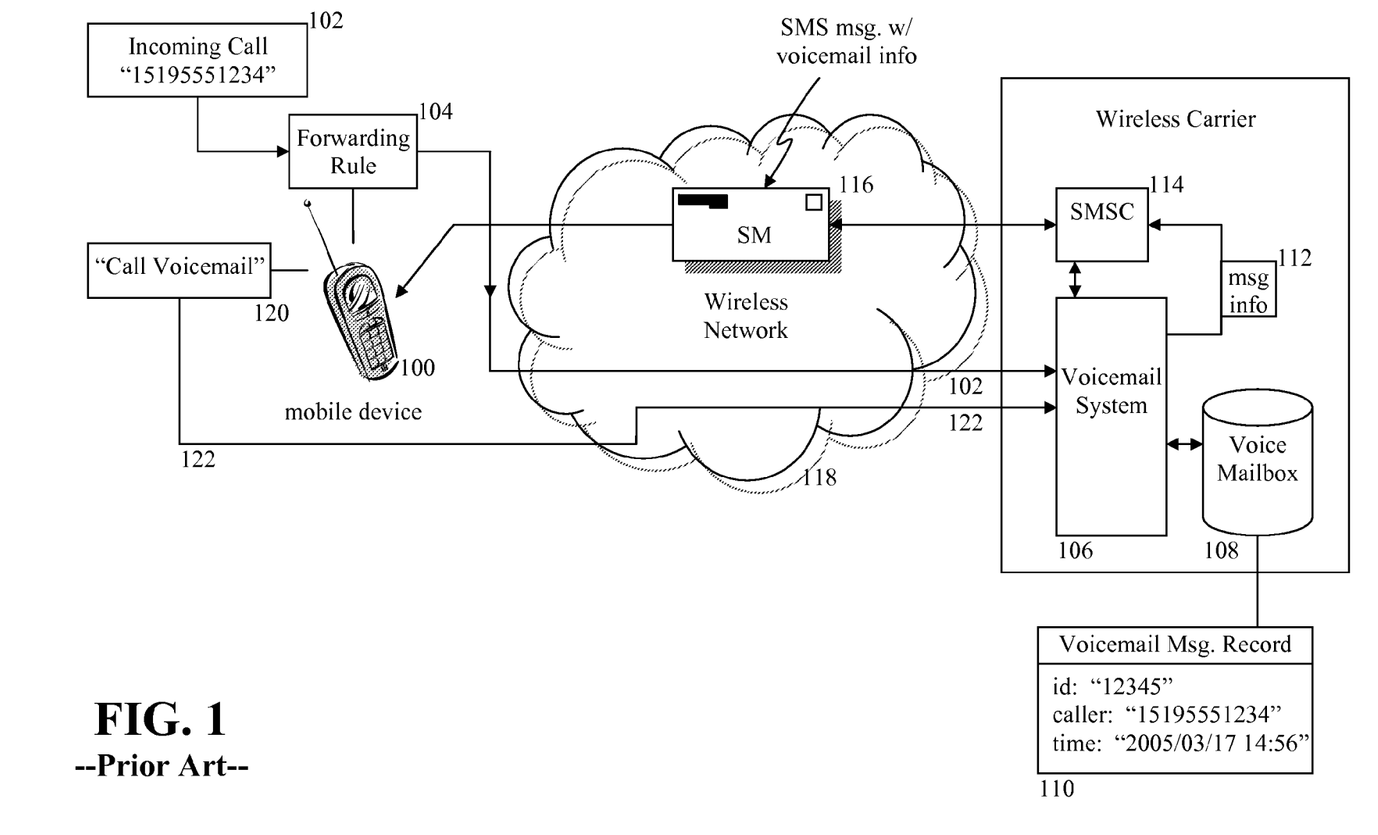
FIG. 1 shows a traditional system for voicemail deposit, messaging, and playback for mobile devices.

Referring now more particularly to the drawings in which like reference numerals indicate like components throughout the several views, FIG. 1 illustrates a conventional system for voicemail deposit, messaging, and playback for mobile devices. Mobile device 100 receives an incoming call 102, which indicates the incoming telephone number. If the call is not answered for any reason, such as, for example, the user ignored it, could not answer in time, turned-off the phone, or the like, a forwarding rule 104 forwards the call to voicemail system 106 in accordance with predetermined rules or criteria.

The voicemail system 106 is preferably located within the wireless carrier infrastructure, and it is connected outside the wireless carrier infrastructure via wireless network 118. The voicemail system 106 typically includes software that resides within the wireless carrier infrastructure. It will be understood, however, that a voicemail system may be implemented as software, hardware, or any combination thereof, and may reside outside a formal wireless carrier infrastructure. The voicemail system 106 may include database 108 that includes a voice mailbox, which, in turn, includes voicemail message records 110. The voicemail message records 110 may contain information such as, for example, the caller's telephone number, the time the call was received, the length of the message, or the like. Preferably, voicemail message records 110 contain unique identifiers that identify each particular message. Associating the unique identifier with the message allows each record to be maintained, independent of a given mobile device. Thus, users can check their messages without the use of a specific device (e.g., users can call in from their own mobile devices, others' mobile devices, conventional landlines, or the like). The unique identifier also enables the voice mailbox to efficiently store and separate all messages within a given voicemail mailbox.

When a voicemail message is deposited, details of the voicemail message may be generated as message information 112. The level of detail in message information 112 may vary, for example, on the type of information available and/or collected. Message information 112 may be transmitted to Short Message Service Center (SMSC) 114, which is a central location through which SMS messages are sent. It will be understood that message information 112 may be stored in a memory or other computer-recordable storage medium, as necessary to a particular implementation. Voicemail system 106 is also in communication with SMSC 114 so that it can, for example, send out voicemail notifications and/or respond to incoming requests from mobile device 100 (for example, retrieve voicemail message, delete voicemail message, or the like) through a network communication with SMSC 114. The SMSC, in general, is the center through which data communications take place. For example, an SMSC, through various protocols, may allow a user to: send, receive, and process SMS messages; download ring tones, e-mails, and other custom data (for example, weather reports, sports scores, or the like); transmit picture messages; receive SMS message delivery notifications; or the like. An SMSC is capable of handling large volumes of data, such as, for example, messages sent between two mobile phones, a mobile phone and a software application, or the like.

For example, a short message (SM) 116 may contain the detailed information from message information 112. SMSC 114 may send SM 116 to mobile device 100 over a data channel rather than an open voice connection. However, a conventional SMSC 114 may not use General Packet Radio Service (GPRS) communication, which is, for example, a non-voice value added service that allows information to be sent and received across a mobile telephone network to supplement Circuit Switched Data and SMS. SM 116 may be displayed on mobile device 100, for example, as a "call voicemail" message 120. Most voicemail systems use Dual-Tone Multi-Frequency (DTMF) systems and/or a circuit switched voice call in combination with the unique identifier to retrieve a voicemail message.

Figure 2:
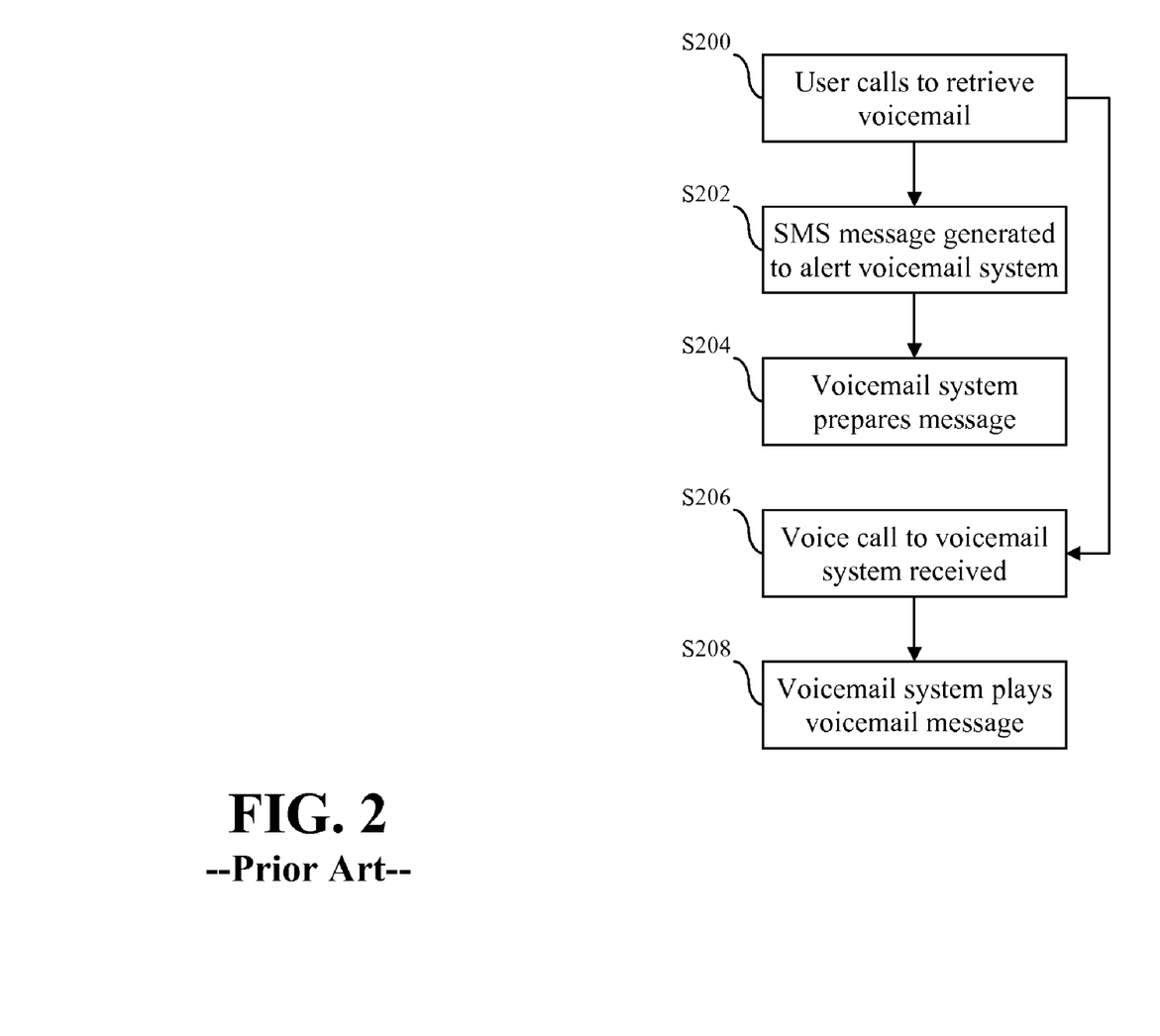
FIG. 2 is a flowchart of a typical system for advance notification for mobile device with message identification.

Building on this basic system, other methods directed to increasing the speed at which messages can be retrieved and played back are illustrated in FIG. 2, which is an illustrative flowchart of a conventional system for advance notification for mobile devices with message identification. For example, users may initiate calls to voicemail systems to retrieve their voicemail messages in step S200. In the meantime, an SMS message is generated in step S202, which, in step S204, notifies the voicemail system to start preparing the message for playback. The process of generating an SMS message, sending it to the voicemail system, and actually receiving the message may take, on average, several seconds. In step S206, the voice call to the voicemail system is received across the wireless network. Then, in step S208, the voicemail system plays back the voicemail message.

Figure 3:
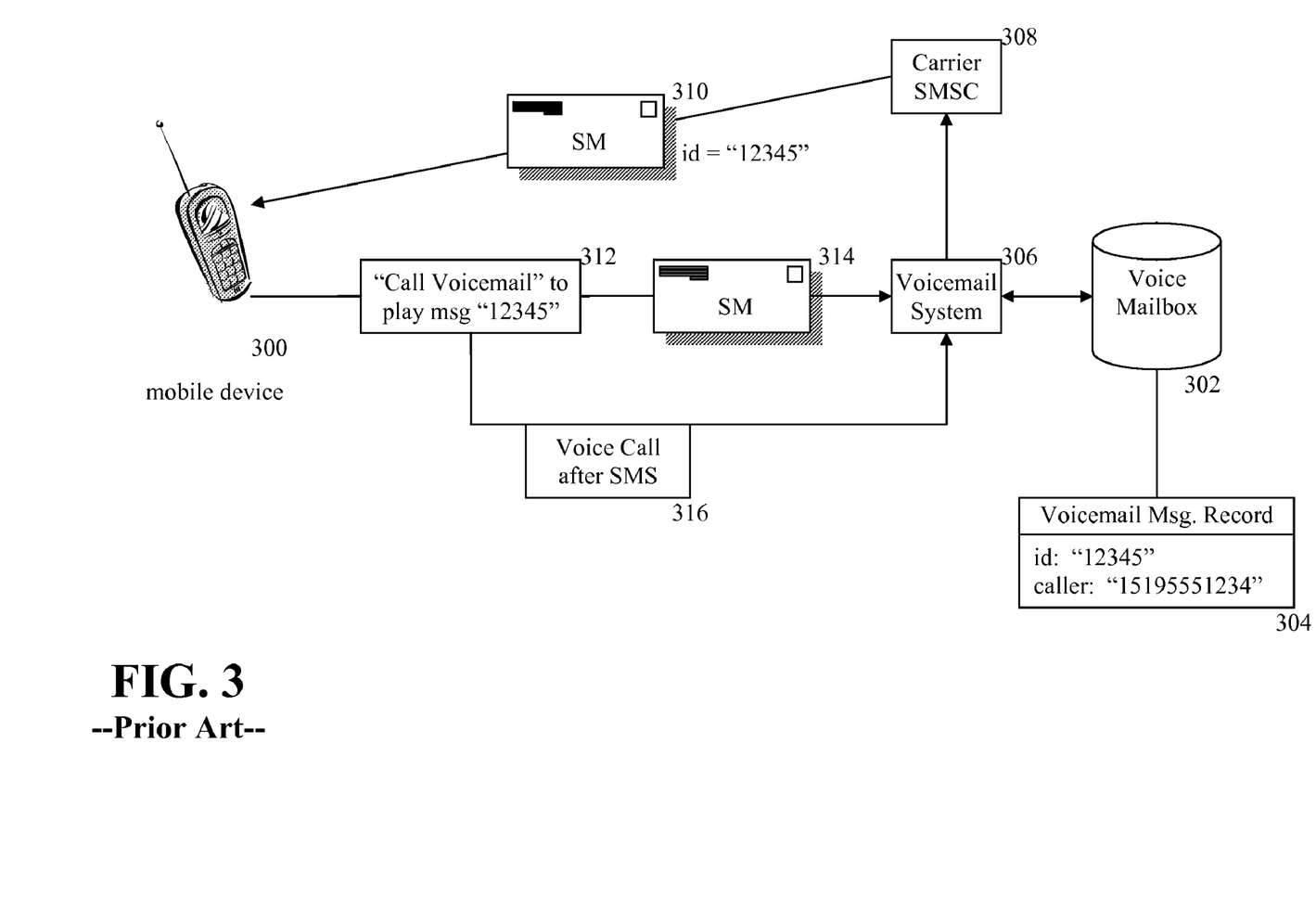
FIG. 3 shows a typical system for advance notification for mobile devices with message identification.

FIG. 3 illustrates a conventional system for advance notification for mobile devices with message identification in greater detail. When a message is received, voicemail system 306 communicates with carrier SMSC 308 to generate and send SMS message 310 to the mobile device 300. If the unique identifier of the voicemail message is known, it is included in SMS message 310. Mobile device 300 receives SMS message 310. When the user iniates a call to voicemail 312 via the mobile device 300, if the unique identifier is known, mobile device 300 can send SMS message 314 to voicemail system 306. SMS message 314 will inform voicemail system 306 that a voice call 316 is about to come in, typically requesting a voicemail message with the attached unique identifier. Voicemail system 306 can then queue up the appropriate voicemail message, in an attempt to make playback quicker.

However, SMS messages, such as SMS message 314, may be unreliable and slow because of the nature of SMS, in general. For example, the mobile device 300 cannot verify that the voicemail server received the SMS message because usually there is no acknowledgement at any step during its transmission. This may lead to myriad disadvantages, such as, for example, the wrong message being played, the voicemail message not being ready when the call is received, or system non-responsiveness.

More particularly, data speed and reliability as a whole (e.g. for any information sent over a data connection) may suffer in conventional arrangements, for example, because of problems within the Wireless Carrier Infrastructure, because of problems between the mobile device and the Wireless Carrier Infrastructure, or the like. Moreover, in conventional arrangements, if data cannot be transmitted, the system may terminate the communications process, send default data to the sender and/or receiver, or otherwise lose data or send corrupted data. Thus, certain exemplary illustrative embodiments seek to improve speed and reliability within the Wireless Carrier Infrastructure itself, while also improving speed and reliability between the mobile device and the Wireless Carrier Infrastructure.

These and other disadvantages may be overcome by including a virtual MSC for use with certain exemplary illustrative embodiments. The virtual MSC may include software and/or hardware components. The virtual MSC may be viewed as part of a Wireless Carrier Infrastructure because, as noted above, it may perform functions such as, for example, controlling the encoding and decoding of data, sending and receiving data, increasing the interoperability of systems, authenticating and more rapidly transporting data, or the like. Although conventional arrangements allow mobile devices to lose connections with an SMSC, the exemplary illustrative embodiments herein preferably enable mobile devices to maintain substantially permanent, high speed data connections (e.g. GPRS connections) with a virtual MSC. Thus, instead of a transient element in a mobile system, the virtual MSC may be more reliably in operable communication with the mobile devices and the other elements included in the Wireless Carrier Infrastructure.

Exemplary illustrative embodiments may convey associated advantages. For example, conventional processing stresses associated with long data transmission times and data verification protocols may be reduced in certain exemplary illustrative embodiments, for both the Wireless Carrier Infrastructure and the mobile device. For example, data being sent from and to mobile devices optionally may pass through a common relay before reaching a virtual MSC (both described in more detail below). The relay may be connected to the virtual MSC using, for example, high-speed and reliable connections. Regardless of whether a relay is used, within the Wireless Carrier Infrastructure, a very fast and reliable communication will be established with the virtual MSC. Additionally, the virtual MSC optionally can be streamlined to perform its core functions without having to, for example, receive, parse, and process all data passing through the Wireless Carrier Infrastructure, some of which may be irrelevant to the proper functioning of the virtual MSC, especially when a relay is implemented. In addition, by using a high-speed, reliable connection to transmit data between the mobile device and the Wireless Carrier Infrastructure, speed and reliability can be increased before being treated within the Wireless Carrier Infrastructure.

Also, the reliability of communications may be improved. According to certain example embodiments, data communications reliability may be improved by passing a series of confirmations between elements in the system. For example, each element in an exemplary illustrative embodiment may continue to send data periodically until the data is successfully received (e.g. as indicated by a return confirmation message) by the next component in the communications change. This arrangement also is advantageous because, for example, data backups at the virtual MSC may be avoided, and the confirmation processing load may be distributed among elements rather than being concentrated at the virtual MSC. Indeed, increased reliability and robustness is an advantage associated with the virtual MSC because, for example, the virtual MSC preferably establishes a substantially permanent data connection with the mobile device and is capable of processing data quickly and reliably.

Although the following embodiments may be explained with reference to specific types of messages and gateways, such as, for example, SMS messages and SMSC and VSMSC gateways, the invention is not so limited. Indeed, certain exemplary illustrative embodiments may be configured to send, receive, and process any type of electronic message capable of being sent over, for example, a data connection, from a voicemail system to a user device (and vice versa), through an appropriately configured virtual message service center gateway. Additionally, although various types of connections are described, such as, for example, substantially permanent GPRS data connections, the invention is not so limited. It will be understood that although permanent connections are desirable, practical realities may prevent such connections from being permanent. Thus, substantially permanent approximating permanent connections may optionally be implemented in certain exemplary illustrative embodiments. Moreover, it will be understood that such substantially permanent connections preferably exist independently from any connections. Thus, even though voice services may not be available, a data connection via the permanent or substantially permanent connection may nonetheless be available.

Figure 4:
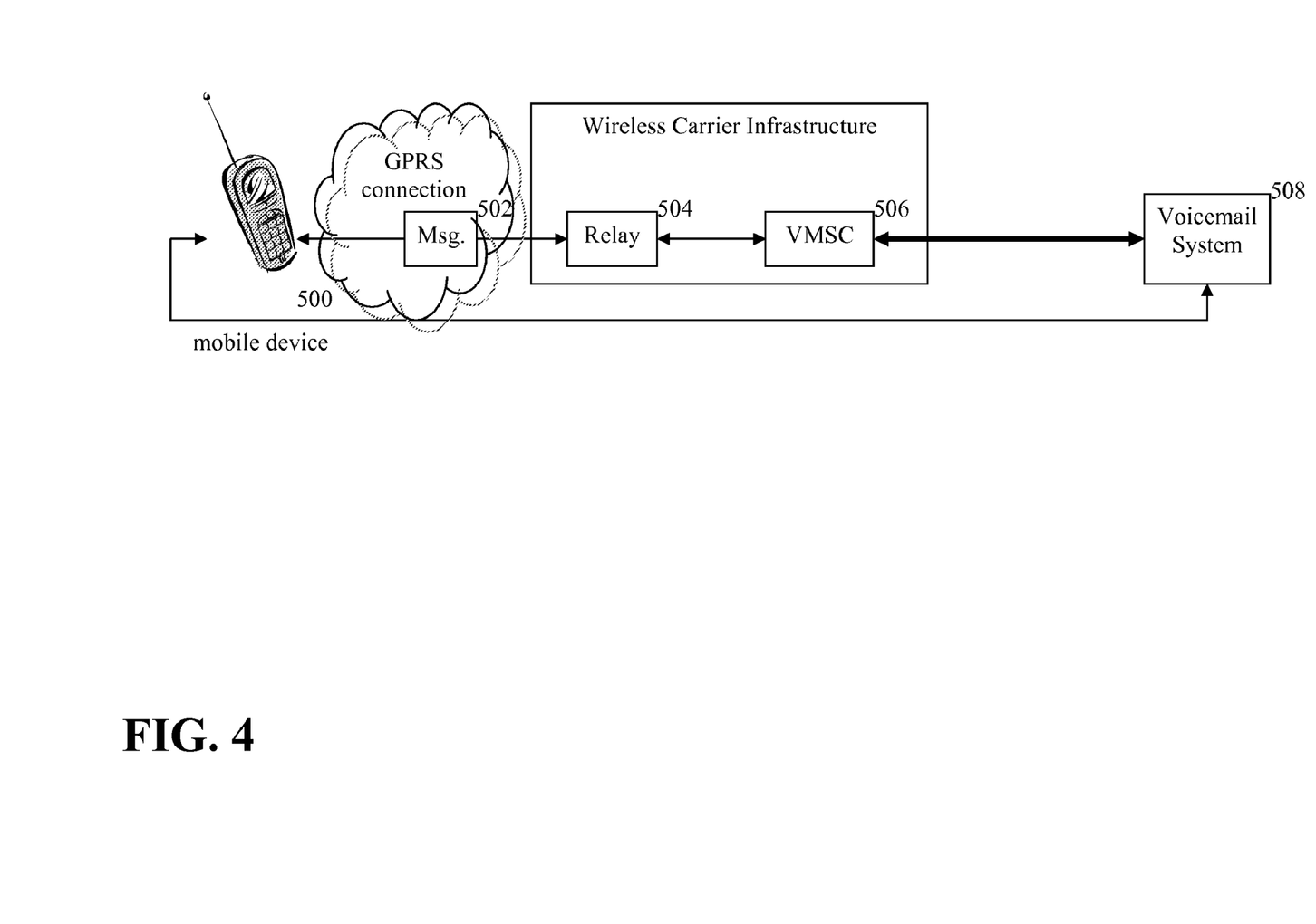
FIG. 4 shows a system of advance notification for mobile devices in accordance with an exemplary illustrative embodiment; and, FIG. 5 is a flowchart of a system of advance notification for mobile devices in accordance with an exemplary illustrative embodiment.

FIG. 4 illustrates a system of advance notification for mobile devices in accordance with an exemplary illustrative embodiment. The system of FIG. 4 is fast and reliable because, for example, it preferably utilizes a substantially permanent data connection such as, for example, GPRS, and preferably acknowledges successful communications between components. When a message is received, rather than connecting to a carrier SMSC, voicemail system 508 communicates with VMSC gateway 506 to generate and send a message (such as, for example, an SMS message) 502, for example, through relay 504. If the unique identifier of the voicemail message is known, it is included in message 502. Preferably, VMSC gateway 506 uses the SMSC protocol, and, preferably, is included in the Wireless Carrier Infrastructure. VMSC gateway 506 may optionally replace or supplement the SMSC of conventional systems. According to exemplary embodiments, VMSC gateway 506 may be software, hardware, or a combination thereof. In this exemplary illustrative embodiment, a relay 504 is the gateway through which all wireless carrier information (for example, data and voice) is transmitted and received. Ultimately, mobile device 500 receives message 502, such as, for example, a voicemail notification message.

When the user uses mobile device 500 to check voicemail messages, if the unique identifier is known, mobile device 500 can send message 502 to voicemail system 508 via the VMSC. Message 502 will inform voicemail system 508 that a voice call is about to come in, most likely requesting the voicemail message with the attached unique identifier. Voicemail system 508 can then queue up the appropriate voicemail message, making playback quicker.

In a process in which the mobile device 500 attempts to retrieve a message, the mobile device generates message 502 to alert the voicemail system of an incoming voice call. Message 502 proceeds to VMSC gateway 506 through relay 504. Finally, message 502 passes from VMSC gateway 506 to voicemail system 508. Reliability is ensured, because, as noted above, transmissions are acknowledged by the communicating mechanisms (for example, the voicemail system and the VMSC gateway, the VMSC gateway and the relay, and the like). Data is sent until receipt is acknowledged. Also as noted above, the entire process may take, on average, less than 1 second. In the meantime, the voice call is placed, and, by the time the voice connection is established, voicemail system 508 is ready to play back the appropriate voicemail message.

The connection is fast in large part because the system preferably uses a service that allows information to be sent and received across a mobile telephone network to supplement Circuit Switched Data and SMS which is substantially permanent, such as, for example, GPRS. Using GPRS, for example, obviates the need to set up a separate data connection, instead piggy-backing the message on an existing data and preferably substantially permanent connection. Furthermore, the VMSC gateway will preferably maintain a high-speed connection with the voicemail system. Because transmitted packets are acknowledged, a reliable connection between the mobile device and the voicemail system is established.

Figure 5:
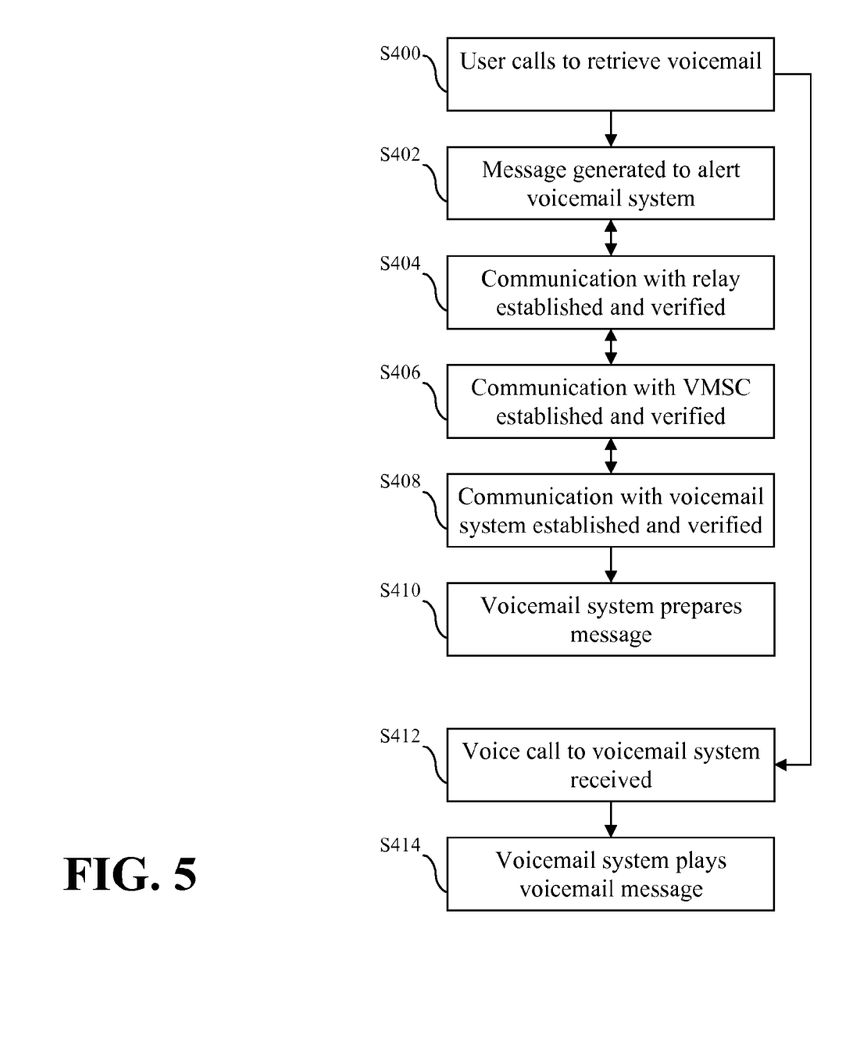

FIG. 5 is a flowchart illustrating an exemplary operational scenario of a system of advance notification for mobile devices in accordance with an exemplary illustrative embodiment. In this example, users call to retrieve their voicemail messages in step S400. In the meantime, a message, such as, for example, an SMS message, is generated in step S402 to alert the voicemail system that the user is likely to retrieve the voicemail message with the given unique identifier. The message is optionally sent to a relay in step S404, and the communication is acknowledged by both the mobile device and the relay. Similarly, in step S406, the message is sent to a virtual MSC (VMSC) gateway, and the communication is acknowledged by both the relay and the VMSC gateway. The message is then sent to the voicemail system in step S408, and the communication is acknowledged by both the VMSC gateway and the voicemail system. In the above steps, if the message is not acknowledged, the sending mechanism preferably continues to try to send the message until receipt is acknowledged. The entire process of generating the message and sending it from the mobile device, through the relay and VMSC gateway, and to the voicemail system is relatively fast. In the meantime, in step S412, the voice call to the voicemail system is received across the wireless network. Then, in step S414, the voicemail system plays back the voicemail message.

It will be understood that although the exemplary illustrative embodiments herein are described with relation to SMS messages and SMSC gates, the invention is not so limited. To the contrary, the exemplary illustrative embodiments described herein may be applied, for example, to any form of electronic communication and/or messaging service implemented over a data connection. It also will be understood that although the exemplary illustrative embodiments herein are described having certain mobile devices and certain fixed devices, the invention is not so limited.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What it claimed is:

1. A virtual message service center gateway in communication with a voicemail system and a user device, comprising:
   a processor operable to:
      establish a substantially permanent data connection between the virtual message service center gateway and the user device, wherein the substantially permanent data connection is independent of a voice connection;
      receive a first message from the voicemail system;
      send the first message to the user device;
      receive a second message from the user device via the substantially permanent data connection; and
      send the second message to the voicemail system wherein the user device generates the second message in response to the user establishing a voice path connection with the voicemail system;
   the first message including information associated with a voicemail message received by the voicemail system; and
   the second message including information associated with queuing up the voicemail message.

2. The virtual message service center gateway of claim 1, wherein said substantially permanent data connection is independent of a voice connection.

3. The virtual message service center gateway of claim 1, wherein said substantially permanent data connection comprises a GPRS connection.

4. The virtual message service center gateway of claim 1, wherein the processor is operable to:
   responsive to the receiving of the second message, send, to the user device via the substantially permanent data connection, an acknowledgement of the receiving of the second message.

5. The virtual message service center gateway of claim 1, wherein the processor is operable to receive the second message from the user device via a relay.

6. The virtual message service center gateway of claim 1, wherein at least one of the first message and the second message comprises an SMS message.

7. The virtual message service center gateway of claim 1, wherein said virtual message service center gateway is associated with a wireless carrier infrastructure.

8. The virtual message service center gateway of claim 1 wherein the processor is operable to:

establish a further substantially permanent data connection between the virtual message service center gateway and the voicemail system; and send the second message to the voicemail system via the further substantially permanent data connection.

9. The virtual message service center gateway of claim 4 wherein the processor is operable to:
receive an acknowledgement of receipt of the second message from the voicemail system;
periodically re-send the second message to the voicemail system; and
cease the re-sending upon the receiving the acknowledgement.

10. The virtual service center gateway of claim 9 wherein the processor is operable to send the acknowledgment to the user device via a relay.

11. At a user device, a method of advanced notification to a voicemail system of access to a voicemail message, said method comprising:
establishing a substantially permanent data connection with a virtual message service center gateway, wherein the substantially permanent data connection is independent of a voice connection;
receiving a first message from the voicemail system, the first message including information associated with the voicemail message; and
sending a second message to the voicemail system through said virtual message service center gateway over the substantially permanent data connection, the second message including information associated with queuing up the voicemail message on the voicemail system wherein the user device generates the second message in response to the user establishing a voice path connection with the voicemail system.

12. The method of claim 11, wherein at least one of the first message and the second message comprises an SMS message.

13. The method of claim 11, wherein said user device comprises a mobile wireless communication device.

14. The method of claim 11, wherein said virtual message service center gateway communicates with said user device via a relay.

15. The method of claim 11, wherein said substantially permanent data connection comprises a GPRS connection.

16. The method of claim 11, wherein said substantially permanent data connection is independent of a voice connection.

17. At a user device, a method of advanced notification to a voicemail system of access to a voicemail message received at the voicemail system, said method comprising:
establishing a substantially permanent data connection with a virtual message service center gateway, wherein the substantially permanent data connection is independent of a voice connection;
receiving a first message from the voicemail system, the first message including information associated with the voicemail message;
sending a second message to a voicemail system through the virtual message service center gateway via the substantially permanent data connection, the second message including information associated with queuing up the voicemail message on the voicemail system wherein the user device generates the second message in response to the user establishing a voice path connection with the voicemail system;
periodically re-sending the second message; and
ceasing the re-sending upon receiving, from the virtual message service center gateway, an acknowledgment of receipt of the second message.

18. A system for advanced notification of a voicemail message, comprising:
a voicemail system providing access to the voicemail message;
a user device for establishing a voice connection to the voicemail system; and
a virtual message service center gateway in communication with the user device and the voicemail system, the virtual message service center gateway operable to establish a substantially permanent data connection with the user device, wherein the substantially permanent data connection is independent of the voice connection;
the user device operable to send a return message associated with the voicemail message to the virtual message service center gateway via the substantially permanent data connection;
the virtual message service center gateway operable to receive the return message from the user device and to send the return message to the voicemail system wherein the user device generates the return message in response to the user establishing a voice path connection with the voicemail system; and
the voicemail system operable to receive the return message from the virtual message service center gateway and queue up the voicemail message.

19. The method of claim 11 including receiving, through the substantially permanent data connection and from the virtual message service center gateway, an acknowledgement of receipt of the second message.

20. The method of claim 19 including:
periodically re-sending the second message to the virtual message service center gateway; and
upon receiving the acknowledgement of receipt, ceasing the resending.

21. The method of claim 11 wherein the sending the second message to the virtual message service center gateway via the substantially permanent data connection includes sending the second message to a relay.

22. The system of claim 18 wherein the virtual message service center gateway is operable to send, to the user device, an acknowledgment of receipt of the return message responsive to receiving the return message.

23. The system of claim 22 wherein the user device is operable to:
periodically re-send the return message to the virtual message service center gateway; and
responsive to receiving the acknowledgment of receipt of the return message, cease the re-sending.

24. The system of claim 18 wherein the substantially permanent data connection is independent of a voice connection between the user device and the voicemail system.

25. The system of claim 18 wherein the substantially permanent data connection comprises a General Packet Radio Service connection.

26. The system of claim 18 wherein the virtual message service center gateway is operable to:
establish a further substantially permanent data connection with the voicemail system; and
send the return message to the voicemail system via the further substantially permanent data connection.

27. The system of claim 18 wherein the user device comprises a mobile wireless communication device.

28. The system of claim 18 further comprising a relay, wherein the virtual message service center gateway is operable to communicate with the user device over the substantially permanent data connection via the relay.

29. The system of claim 18 wherein at least one of the first message and the second message comprises a Short Message Service message.

30. The system of claim 18 further comprising a wireless carrier infrastructure associated with at least one of the virtual message service center gateway and the voicemail system.

* * * * *